United States Patent [19]

Prabhakar et al.

[11] Patent Number: 5,832,120
[45] Date of Patent: Nov. 3, 1998

[54] UNIVERSAL MPEG DECODER WITH SCALABLE PICTURE SIZE

[75] Inventors: Ramaswamy Prabhakar, Campbell; Tzoyao Chan, Saratoga; Jih-Hsien Soong, Cupertino, all of Calif.

[73] Assignee: Cirrus Logic, Inc., Fremont, Calif.

[21] Appl. No.: 622,330

[22] Filed: Mar. 26, 1996

Related U.S. Application Data

[60] Provisional application No. 60/009,161 Dec. 22, 1995.

[51] Int. Cl. [6] .............................. G06K 9/36; G06K 9/46
[52] U.S. Cl. ...................... 382/233; 382/250; 382/261; 382/299; 382/300
[58] Field of Search ................................ 382/233, 250, 382/251, 236, 260, 261, 264, 279, 299, 300, 166; 348/291, 292, 401, 402, 405, 420; 364/724.1

[56] References Cited

U.S. PATENT DOCUMENTS

| | | | |
|---|---|---|---|
| 4,903,128 | 2/1990 | Thoreau | 358/167 |
| 4,941,043 | 7/1990 | Jass | 358/133 |
| 5,196,930 | 3/1993 | Kadono et al. | 358/133 |
| 5,343,250 | 8/1994 | Iwamura | 348/564 |
| 5,367,629 | 11/1994 | Chu et al. | 395/162 |
| 5,371,549 | 12/1994 | Park | 348/564 |
| 5,384,849 | 1/1995 | Jeong | 380/49 |
| 5,398,079 | 3/1995 | Liu et al. | 348/699 |
| 5,408,269 | 4/1995 | Tsukagoshi | 348/416 |
| 5,469,213 | 11/1995 | Koga et al. | 348/401 |
| 5,473,376 | 12/1995 | Auyeung | 348/403 |
| 5,475,434 | 12/1995 | Kim | 348/420 |
| 5,491,515 | 2/1996 | Suzuki | 348/401 |
| 5,497,246 | 3/1996 | Abe | 358/426 |
| 5,635,985 | 6/1997 | Boyce et al. | 348/402 |

*Primary Examiner*—Phuoc Tran
*Attorney, Agent, or Firm*—Robert P. Bell; Steven A. Shaw

[57] ABSTRACT

A decoder is disclosed for decoding MPEG video bitstreams encoded in any color space encoding format and outputting the decoded video bitstream to different sized windows. Both MPEG decompression and color space decoding and conversion are performed on the bitstreams within the same decoder. The disclosed decoder may be programmed to output the decoded video bitstream in any of three primary color space formats comprising YUV 4:2:0, YUV 4:2:2, and YUV 4:4:4. The decoder may also output the decoded bitstream to different sized windows using Discrete Cosine Transform (DCT) based image resizing.

28 Claims, 8 Drawing Sheets

UNIVERSAL MPEG DECODER WITH SCALABLE PICTURE SIZE

CROSS-REFERENCE TO RELATED APPLICATIONS

The present application claims priority from Provisional application Ser. No. 60/009,161 entitled Universal MPEG Decoder with Scalable Picture Size filed Dec. 22, 1995.

FIELD OF THE INVENTION

The present invention relates to a Discrete Cosine Transform-based decoding apparatus for decoding video data streams in multimedia computer systems. More specifically, this invention relates to an MPEG video stream decoder for decoding video data encoded in any one of three color space formats. Motion video is encoded according to specific standards and specific color space formats. A universal decoder may simplify decoding and output of a video data stream in different formats.

BACKGROUND OF THE INVENTION

Computers with multimedia capabilities have become commonplace. Multimedia computers are loosely defined as computers with display capability for text, high resolution graphics, high resolution images, high dynamic range audio and high resolution motion video. One problem accompanying multimedia computing may be large image frame sizes. Large image frames stored in primary or secondary memory may be retrieved from memory, transferred across system busses and displayed via display controllers. With larger images, more data may be transferred and it may take additional time for large images to be displayed. Problems may be magnified for display of multiple successive image frames associated with motion video. Fast video frame updates must occur frequently enough to provide video free from anomalies such as delay, slowed motion, or choppiness associated with slow or erratic updating.

The standard in high resolution still frame image display may be an image with 1024 pixels by 768 lines of display resolution with 24 bits of color information per pixel. With no compression or other encoding, a standard frame approaches a size of 20 megabytes. With full motion digital video requiring a minimum frame rate of about 30 frames per second to simulate live motion, full-size, full-resolution, non-encoded motion video may be impractical on existing computers with limited bus transfer capability. In order to successfully display high resolution motion video on multimedia computers it may be necessary to employ a scheme to compress and encode motion video data to minimize frame size for intrabus transfer. Image frames may be fully decompressed and displayed at full resolution in a display controller after bus transfer. It may also be necessary to set a maximum standard window or frame size for efficient display of motion video. The combination of optimum frame size and compression encoding method may make display of motion video on multimedia computers possible.

MPEG has become a motion video compression standard widely accepted in both hardware and software multimedia communities as a compression and decompression standard of preference for motion video frames. MPEG derives its name from International Standards Organization's (ISO) Motion Picture Encoding Group (MPEG). MPEG specifications call for compression of consecutive motion video frames accomplished by making the first frame in a video sequence and periodic frames thereafter, reference or base frames. MPEG specifications then call for computing a mathematical difference between a present frame and a previous base frame, storing only a computed difference between the two. Motion compensation may also be performed since an object in one frame which would normally register no differences in subsequent frames when still may register a difference attributable only to motion.

MPEG computes differences between base frames and subsequent inter-frames by breaking frames into 8- by 8-pixel blocks and matching pixels from each block to corresponding pixel locations in the base frame. Differences are compressed using a method called DCT (Discrete Cosine Transform). Once computed, DCT coefficients may be Huffman-coded to produce a final block size which may often be one-tenth to one-twentieth of original block size. The DCT may be integral to the preferred embodiment of the present invention. A detailed description of the DCT is presented here as background.

If a DCT block size is assumed to be N in one direction, then a type-2 DCT ($X_{IIE}$) used for computing a forward DCT for a block size of N×N may be given by:

$$X_{IIE}\{X(n)\} = (2/N)^{1/2} k(m) \sum_{n=0}^{N-1} x(n) \cos(\Pi m(n+1/2)/N) \quad (1)$$

$$m = 0, 1 \ldots N-1$$

where x(n) is a pixel in block N×N.

A weighing function may be defined as follows:

$$K(m) = \begin{cases} 1/\sqrt{2} & m = 0 \text{ or } N \\ 1 & m = 1, 2, 3, \ldots N-1 \end{cases}$$

To understand Remez Exchange low-pass Finite Impulse Response (FIR) filtering which may be used in the preferred embodiment of the present invention, a discussion of general characteristics of FIR filters may be helpful.

An FIR filter may sometimes be called a moving-average filter. An FIR filter may also be called a non-recursive filter or a convolution filter. The duration or sequence length of the impulse response of these filters is by definition finite; therefore, an output function may be written as a finite convolution sum as follows:

$$y(n) = \sum_{m=0}^{N-1} h(m) \times (n-m) \quad (2)$$

where x(n) are input vectors and h(m) is the impulse response.

An FIR filter may be interpreted as an extension of a moving sum or as a weighted moving average. In any sequence of random numbers, such as prices from daily stock market prices for a particular stock, it may be desirable to remove erratic variations to discover longer trends. Each number may be replaced by a value corresponding to an average of itself and the preceding three values. Variations within a four day period may be "averaged" out and "longer" term variations remain.

For illustration, we consider a signal x(n), which may contain a sum of a linear term $K_1 n$, and an undesired oscillating signal, such that $$x(n) = K_1 n + K_2 \cos(\Pi n) \quad (3)$$

If we assume two elements in a FIR filter, then h(n) may be $$h(n) = \begin{cases} 1/2 & n = 0, 1 \\ 0 & \text{otherwise} \end{cases}$$

After two iterations, the output is a linear term with a delay of one-half samples and no oscillation illustrating the moving average principal of an FIR filter.

Upscaling or interpolation of a motion video frame containing image data involves introducing zeros as data values for even samples. After upscaling image data, a low-pass filter stage may be applied to image data signal to average data evenly over a resized block which has undergone interpolation and decimation. The filter may be an even-length symmetric filter.

In low-pass filtering based on a Remez Exchange algorithm, five parameters may be of interest in a symmetrical filter:

1) N—Filter length
2) $f_p$—The edge of the pass band specified as a fraction of sampling frequency.
3) $f_s$—The edge of the stop band specified as a fraction of sampling frequency.
4) $\delta_1$—The deviation from unity in the pass band.
5) $\delta_2$—The deviation from zero in the pass band.

A low-pass Remez filter may be an even length symmetric filter whose tap size is 32. A tap size of 32 may accommodate DCT block-sizes which may be either 16×8 or 16×16. More taps in the Remez Exchange filter may result in better convolution of filter coefficients and more accurate reproduction of upsampled and downsampled pixels.

A Remez low-pass filter may be generally defined as h(n), N=–L/2 . . . 0, . . . L/2–1. The Remez filter right-half is defined by $$h'(n) = \begin{cases} h(n) & n = 0, 1, 2 \ldots L/2 - 1 \\ 0 & n = L/2 \ldots N - 1 \end{cases} \quad (4)$$

where L may be the number of filter coefficients for h(n) and N may be the block size of the IDCT.

MPEG implementations require several important functions difficult to implement on a general-purpose CPU. Motion estimation and compensation require block comparisons between corresponding base frame block locations and present frame block locations. 8 by 8 pixel DCT block location comparisons between intraframes and base frames may not correspond one to one due to motion. The DCT specification in MPEG, like other compression methods, may be more effective with highly correlated data. Thus, even though motion may have occurred in intraframes relative to base frames, computationally intensive search procedures incorporating motion detection may be used to find such redundancies.

Existing hardware MPEG decoders (e.g., CL450) decode a compressed bitstream into a single display format such as YUV 4:2:0, YUV 4:2:2, and YUV 4:4:4 format depending on a particular compression format used upon encoding. Encoding formats may be geared toward anticipated display device capabilities or may be chosen to provide a format appropriate for compatibility with the broadest base of display devices. In practice, display devices may most likely be VGA terminals. Most VGA terminals may display video in YUV 4:2:2 color space format. Other potential destination devices may include a D-1 recorder typically employing YUV 4:4:4 format.

YUV color space is the basic color space used by PAL (Phase Alternation Line), NTSC (National Television System Committee) and SECAM (Sequential Couleur Avec Memoire) color video standards. The Y component (luminance) stands for intensity information while U and V components (chrominance) stand for color information. MPEG compression and decompression standards specify color space encoding in YUV color space. There are three primary YUV formats: YUV 4:2:0, YUV 4:2:2, and YUV 4:4:4. Such color space formats may describe the proportion of Y, U, and V component information in each byte or collection of bytes of display information.

Motion video may comprise encoded data corresponding to each frame of video data in a motion video sequence. Each frame may comprise three rectangular matrices representing luminance (Y) and two chrominance (CbCr) values. The Y matrix may have an even number of rows and columns. In MPEG-1, the Y matrix may describes the intensity component of a frame of size 352 pixels by 240 lines. The chrominance components may be one of several configurations depending on the encoding format. FIG. 1 illustrates three primary color space encoding formats used in MPEG compression.

In YUV 4:2:0 format illustrated in FIG. 1a, chrominance component matrices 111, and 112 are one half in size of Y matrix 110 in horizontal and vertical directions. In YUV 4:2:2 format illustrated in FIG. 1b, chrominance component matrices 121, and 122 are one half in size of Y matrix 120 in the horizontal direction and the same size as Y matrix 120 in the vertical direction. Finally, in YUV 4:4:4 format illustrated in FIG. 1c, chrominance matrices 130, and 131 are specified as being the same size as Y matrix 130 in both horizontal and vertical directions.

SUMMARY OF THE INVENTION

A universal MPEG decoder decodes a video bitstream representing video frame blocks MPEG encoded in one of three primary color space formats. The decoder of the present invention may be selectively programmed to support YUV 4:2:0, YUV 4:2:2, and YUV 4:4:4 input and output display formats. Any input format may be decoded and output in any output format. Moreover, the decoder of the present invention performs dynamic image frame-size scaling.

BRIEF DESCRIPTIONS OF THE DRAWINGS

DETAILED DESCRIPTION OF THE INVENTION

The descriptions herein are by way of example only illustrating the preferred embodiment of the present invention. However, the method and apparatus of the present invention may be applied in a similar manner in other embodiments without departing from the spirit of the invention.

Figure 1A:
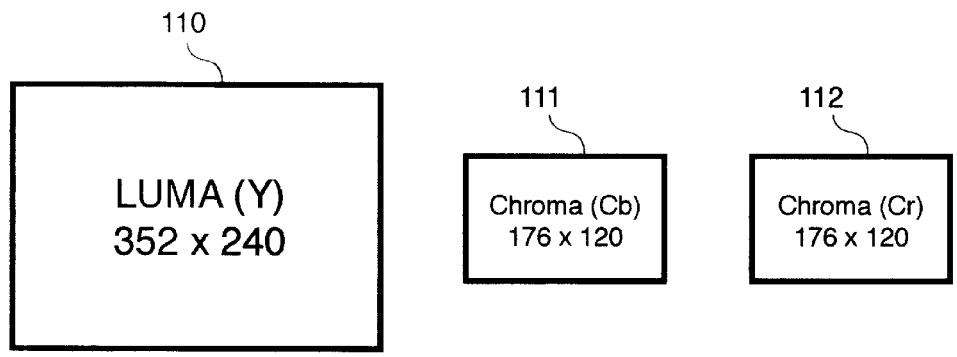
FIG. 1a is a diagram illustrating YUV 4:2:0 color space format.
Figure 1B:
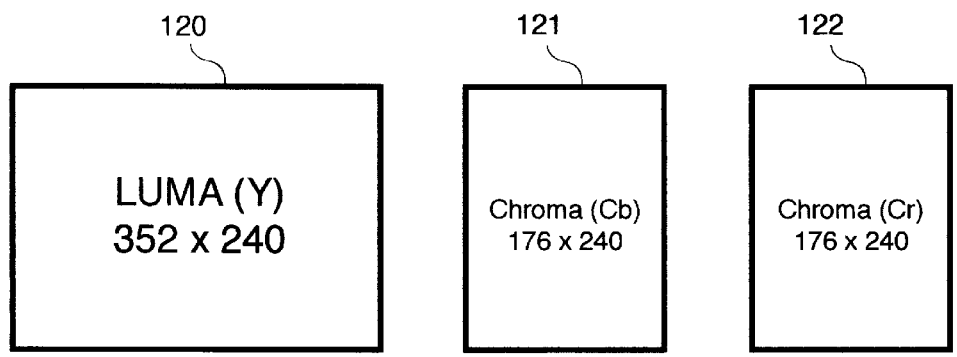
FIG. 1b is a diagram illustrating YUV 4:2:2 color space format.
Figure 1C:
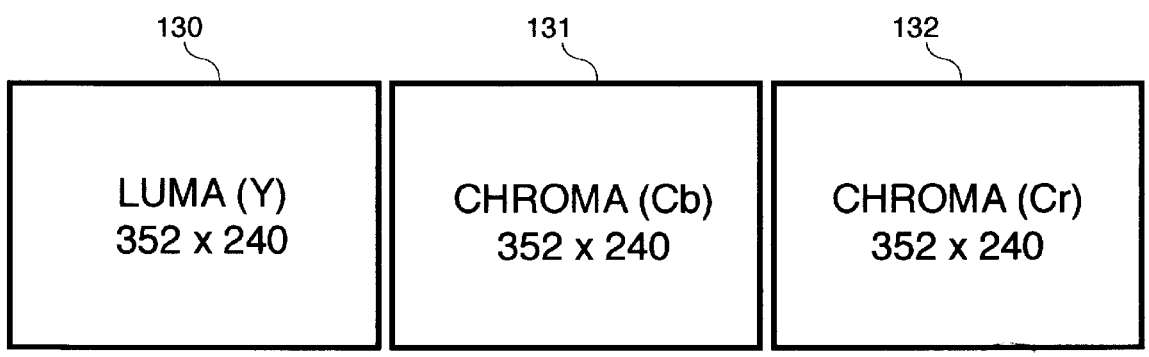
FIG. 1c is a diagram illustrating YUV 4:4:4 color space format.

FIGS. 1a, 1b, and 1c are diagrams illustrating three different formats describing color space in a motion video frame. A motion video frame may consist of three rectangular matrices representing luminance Y and two chrominance (CbCr) or U and V values. Y matrices 110, 120, and 130 may have an even number of rows and columns. Chrominance component matrices 111 and 112 may be one half in size of Y matrix 110 in horizontal and vertical directions in YUV 4:2:0 color space format. FIG. 1a is a diagram illustrating YUV 4:2:0 color space format. In YUV 4:2:2 format, chrominance component matrices 121, and 122 may be one half in size of Y matrix 120 in the horizontal direction and of the same size in the vertical direction. FIG. 1b is a diagram illustrating YUV 4:2:2 color space format. In color space format YUV 4:4:4, chrominance matrices 131, and 132 may be the same size as Y matrix 130 both in the horizontal and vertical directions. FIG. 1c is a diagram illustrating YUV 4:4:4 color space format.

Figure 2:
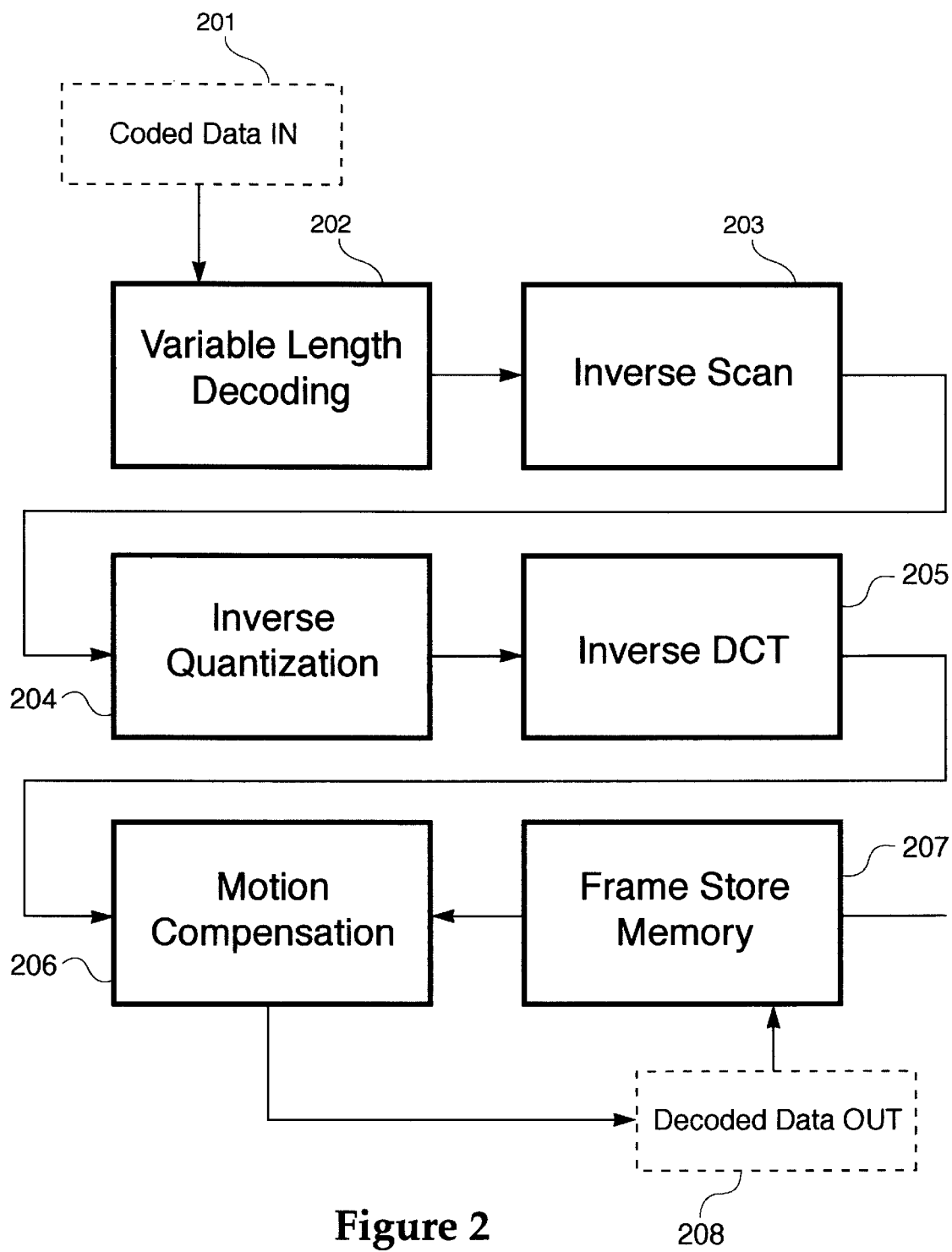
FIG. 2 is a block diagram illustrating elements of a simple MPEG Decoder.

FIG. 2 is a block diagram illustrating elements of an MPEG Decoder. Coded data 201 is input to Variable Length Decoding block 202. Data decoded in Variable Length Decoding block 202 is output to Inverse Scan block 203. Data processed by Inverse Scan block 203 is output to Inverse Quantizer block 204. Inverse Quantized data processed in Inverse Quantizer block 204 is output to Inverse Discrete Cosine Transform (IDCT) block 205. Data processed by IDCT block 205 is output to Motion Compensation block 206.

Motion estimation may be performed in Motion Compensation block 206 on luminance and chrominance components in an MPEG encoder. Motion vectors may be computed for luminance components only. Image scaling only may affect motion compensation for chrominance components. When motion compensation is decoded in an MPEG decoder, motion vectors for chrominance components may be derived from luminance components and a scaling factor. For example, an image upscaled from 4:2:0 to 4:4:4 may have the same motion vectors for chrominance components Cb and Cr as for Y. Data processed by Motion Compensation block 206 is output as Decoded Data Out 208. Video frames occurring as Decoded Data Out 208 may be stored in Frame Store Memory 207 and may be used by Motion Compensation block 206 to compare the present frame with previous frames. Because image scaling may require minimal color space formats to be upscaled to comprehensive color space formats, Frame Store Memory 207 may have to be large enough to accommodate image frames corresponding to YUV 4:4:4 format.

Figure 3:
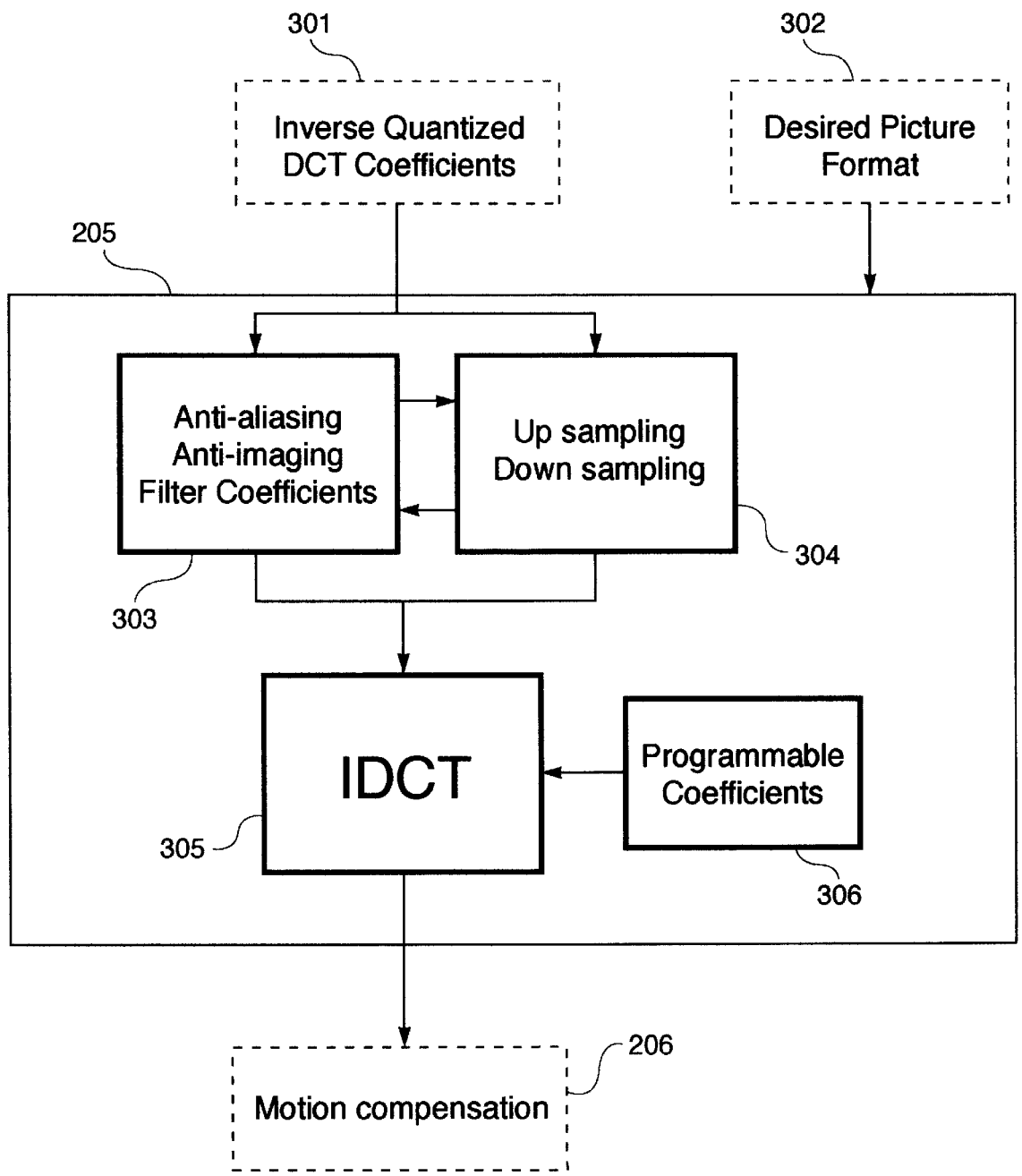
FIG. 3 is a block diagram illustrating elements of the IDCT block of the present invention.

FIG. 3 is a block diagram illustrating elements of IDCT block 205 of FIG. 2. Inverse Quantized DCT coefficients 301 are input from Inverse Quantizer block 204 to Anti-aliasing Anti-imaging block 303 and Up-sampling/Down-sampling block 304. Coefficients are output to IDCT block 305. Programmable Coefficients 306 may be input to IDCT block 305 prior to output of a video stream to Motion Compensation block 206. Desired Picture Format 302 may be input to IDCT block 205 to specify the color format of the output of the decoder of the present invention.

Figure 4:
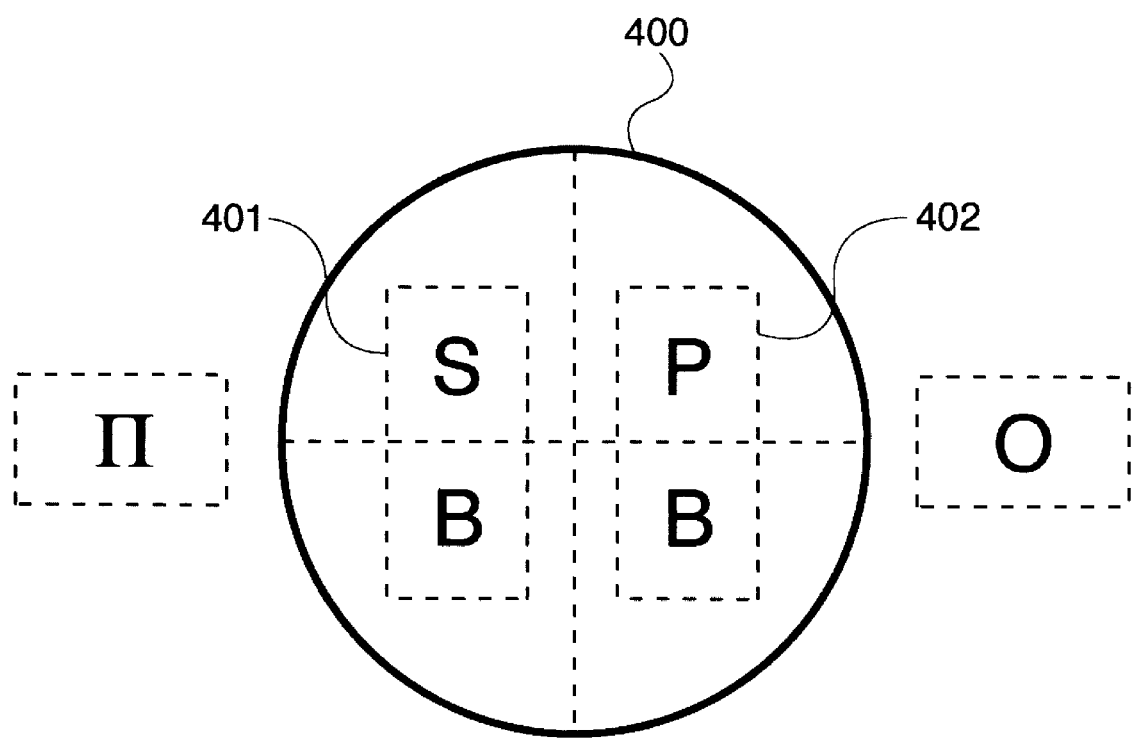
FIG. 4 is a diagram illustrating the pass band and stop band of a Remez Exchange filter superimposed upon a unit circle.

FIG. 4 is a diagram illustrating pass band and stop band of the Remez Exchange filter superimposed upon a unit circle of radius I and circumference of $2\Pi$. The pass-band may be between 0 and $\frac{1}{2}\Pi$ and between $\frac{3}{2}\Pi$ in the 2Å unit circle. Pass band PB 401 and stop band SB 402 of a Remez Exchange filter are illustrated in the response plot of FIG. 4. Because the filter is symmetric, PB 401 includes all the signals with frequency's between 0 and $\frac{1}{2}\Pi$ and 0 and $-\frac{1}{2}\Pi(\frac{3}{2}\Pi)$. Similarly, SB 402 is between $0.5\Pi$ and $-0.5\Pi$. Gain of the filter is unity in PB 401 and attenuation in SB 402 is −30 db.

The following are computed Remez Exchange filter coefficients.

| | |
|---|---|
| 4.4996e-01 | 2.3573e-02 |
| 1.4953e-01 | 2.0967e-02 |
| −8.9156e-02 | −1.8786e-02 |
| −6.3129e-02 | −1.4276e-02 |
| 4.8479e-02 | 9.9493e-03 |
| 3.9131e-02 | 2.2767e-02 |
| −3.2452e-02 | −3.5774e-02 |
| −2.7510e-02 | −1.7824e-02 |

Filter coefficients shown above may represent h(n) for n=0, 1, 2 ... L/2−1 but convolution of filter coefficients and re-ordered DCT coefficients may be performed in the DCT domain, which may be given by the following equation.

$$H'(m) = 2 \sum_{n=0}^{N-1} h'(n)\cos(\Pi m(n+1/2)/N) \quad m = 0, 1 \ldots N-1 \quad (5)$$

Up-sampling and Down-sampling block 304 may be used to interpolate a vector k(n) =[x(n)] to twice its original size by upsampling, where x(n) is the individual vector in R. Upsampling may involve a function f(n) with vector k(n) padded with zeros on the right.

f(n)={x1(n), x2(n), x3(n), x4(n), x5(n), x6(n), x7(n), x8(n), 0, 0, 0, 0, 0, 0, 0, 0};

Assuming k(n) to be a vector at positions 1, 2, 3, 4, 5, 6, 7, 8, computing $C_{IIE}$, is represented by equation (6). The upsampling property states:

$$C_{IE}=X_u(m)=(f(n)_u(m)-f(n)_u(N-m)/\sqrt{2} \quad m=0, 1 \ldots N-1 \quad (6)$$

Using eq(1), we compute $$C_{IIE}\{X_u(m)\} \quad (7)$$

where the values of $$X_u(m) = \begin{cases} 0, & m \text{ even} \\ f^{(n-1/2)}, & m \text{ odd} \end{cases}$$

It may be possible to implement digital filters in the DCT domain in Anti-aliasing Anti-imaging block 303. The convolution form of the Remez Exchange low-pass filter (eq(4)) in the DCT domain may be given as follows:

$$H(m) = 2 \sum_{n=0}^{N-1} h(n)\cos(\Pi m(n+1/2)/N) \quad m = 0, 1 \ldots N-1 \quad (8)$$

Using upsampled pixels computed from eq(7) and low-pass filter coefficients in the DCT domain from eq(8) processed in Up-sampling and Down-sampling block 304, a resized (interpolated) signal is computed using the following equation.

$$V_1(m) = C_{IE}\{k(n)v(n)\} \quad m,n=0, 1, 2 \ldots N \tag{9}$$

$$y(n) = C^{-1}{}_{IIE}(C_{IIE}\{2*h'(n)*V^1(m)\}) \quad m,n=0, 1, 2 \ldots N \tag{10}$$

The type-2 IDCT may be given by the following equation $$x(n) = (2/N)^{1/2} \sum_{m=0}^{N-1} k_m X^{c(2)}(m)\cos[(2n+1)m\Pi]/2*N \tag{11}$$

$$n = 0, 1 \ldots N - 1$$

where $X^{c(2)}(m)$ is the re-ordered DCT pixel coefficients.

The following steps may be used to interpolate an image by two in both dimensions in Up-sampling and Down-sampling block 304:

1) Type (2) forward 2-dimensional DCT of an image by block N×N using eq(5).
2) Upsample pixels using eq(6) and eq(7), which may result in a block of size 2N ×2N still in the DCT domain.
3) Multiply each block 2N×2N block with 2-D DCT domain low-pass filter coefficients (eq(8)) in Anti-aliasing Anti-imaging block 303 to accomplish anti-imaging low-pass filtering.
4) Perform Type-2 Inverse IDCT on each resulting block of step-3 in IDCT block 305 which may result in an image doubled in both directions using eq(11) which may then be output to Motion Compensation block 307.

The following example illustrates upsampling, convolution-multiplication of a motion video image DCT in one-dimension, and enlarging to an SIF 352×240 image in Decoder 300 using Up-sampling and Down-sampling block 304, Anti-aliasing Anti-imaging block 303, IDCT block 305, and programmable coefficients 306 in the preferred embodiment of the present invention.

1) Take the following 8 signals:
   x(n)={1, 2, 3, 4, 5, 6, 7, 8} at positions 1, 2, 3, 4, 5, 6, 7, 8
2) Compute $X_H(m)$ using eq(2):
   X2(m): 1 . . . 8
   X2(m)=12.7279  −6.4423  0.0000  −0.6735  0.0000  −0.2009  0.0000  −0.0507
3) Upsample in Up-sampling Down-sampling block 304 by padding X2(m), with 8 zeros.
   X2(m) for 9 through 16
   X2(m)=0.0000 0.0000 0.0000 0.0000 0.0000 0.0000 0.0000 0.0000 x(n) may now be twice its original length.

4) Compute $C_{IE}$ using eq(6).
   $C_{IE}$=9.0000  −4.5554  0.0000  −0.4762  0.0000  −0.1421  0.0000  −0.0359  0.0000  0.0359  0.0000  0.1421  0.0000  0.4762  0.0000  4.5554

Except for the first term, which is a DC coefficient, the even term is always a zero.

5) Multiply upsampled pixels obtained in step 4 and Remez low-pass filter coefficients given in table 1 in the DCT domain using eq(8).
6) Compute the 2D IDCT on the product obtained in step 4, using eq(1). The result is an interpolated signal rx(n) which is twice the size of the original signal x(n).

Using the same basic principle to interpolate a 352×240 SIF frame, interpolate the frame in both directions. The result may be an SIF frame of size 704×480. After upsampling the 8×8 block, the result is a 16×16 block in the DCT domain with padded zeros. After multiplying the re-ordered DCT coefficients with the low-pass filter coefficients in DCT domain and computing the inverse type-2 DCT of the product, an SIF image frame whose size is 704×480 may be the result.

Interpolating the old 352×240 SIF image frame in both directions in the spatial domain with seven tap filter coefficients [−29 0 140 256 140 0 −29], still results in a 704×480 interpolated image frame.

Examining the 704×480 interpolated image frame in spatial frequency domain and the DCT domain, the DCT domain image appeared to retain more information than the spatial frequency domain interpolation. Such a result may be due to:

1) Losslessness in the DCT domain relative to the spatial frequency domain.
2) The DCT domain resizing being a point-wise convolution-multiplication and sampling rate change, hence filter coefficients should be those of an even-tap filter. For symmetric convolution, the maximum number of filter coefficients may be twice the DCT block size resulting in a 32 tap filter. Filters with many taps result in sharper frequency response. Using a 32 tap filter may not affect the number of operations to achieve a Remez exchange response. Consequently, for DCT based interpolation, the longest possible tap filter may be used, without any extra hardware or latency involved resulting in a better response than that of the 7-tap spatial frequency domain interpolation.

The following data may represent an approximate comparison for a 32-tap DCT domain interpolation and a 7-tap spatial frequency domain interpolation:

1) Spatial frequency domain interpolation:

Interpolating from YUV 4:2:0 to YUV 4:2:2 format on a 4:2:0 SIF picture, whose chrominance size is 176×120, averaging the pixels using a 7-tap filter whose coefficients are [−29 0 140 256 140 0 −29] requires several steps. Assuming 3 multiplication operations which comprise 3 shift operations and 2 addition operations each, and 2 addition operations, 17 total operations are required. To interpolate 176×120=21120 pixels, it takes 359040 basic operations per chrominance component in the spatial frequency domain. For both chrominance components, interpolation in spatial frequency domain for 4:2:0 to 4:2:2 format takes approximately 720000 operations.

To interpolate from 4:2:0 to 4:4:4 in the spatial frequency domain, 4:2:0 to 4:2:2 interpolation may first be performed. Interpolation may then be performed from 4:2:2 to 4:4:4 using the same basic principle. For both chrominance components, the number of basic operations to interpolate 4:2:0 to 4:4:4 may be approximately 1.4 million.

2) Interpolation in DCT Domain:

Type-2 IDCT may be performed on a 16×8 block to begin 4:2:0 to 4:2:2 interpolation. There may be 1724 basic operations per 16×8 block comprising 160 multiplies and 864 adds, assuming 4 shifts and 3 adds per multiply operation. For each chrominance component with a size of 176×120 there may be 330 blocks resulting in 570000 basic operation per chrominance component per interpolated frame. For both chrominance components, 1040000 operations may be required.

The IDCT block size may change from 16×8 to 16×16 for interpolation between 4:2:0 to 4:4:4 and the number of operations may double. The number of operations to interpolate both the chrominance components may be 2.6 million.

For encoded bit-streams in YUV 4:2:2 or YUV 4:4:4 formats, no modifications to the hardware decoder of the present invention may be required to perform decimation. Decimation may involve downscaling of images by simply eliminating or throwing away information from the image. Decimation in the DCT domain may involve the same basic principles used to interpolate in Up-sampling Down-sampling block 304.

Decimating a sequence x(n) to half its original size may first require an anti-aliasing low-pass filter step which may be performed in Anti-aliasing Anti-imaging block 303, then downsampling pixel coefficients are generated in Up-sampling and Down-sampling block 304. Finally, the type-2 IDCT may be computed in IDCT block 305.

In the preferred embodiment of the present invention, a Remez Exchange low-pass filter may be used to perform anti-aliasing low-pass filtering associated with decimation in Anti-aliasing Anti-imaging block 303. The pass-band and stop-band calculations for the anti-aliasing low-pass filter for decimation purposes and the low-pass filter for interpolation may be identical as illustrated in FIG. 4.

If X(m) represents the inverse quantized DCT coefficients of the image frame to be downscaled, the coefficients may be low-pass filtered in the DCT domain using the following equation:

$$Y(m) = H(m)X(m), \quad m, n = 0, 1, \ldots, N-1 \quad (12)$$
$$\phantom{Y(m)} = 0, \quad m = N$$

Y(m) represents the low-pass filtered sequence of X(m).

To perform downsampling, Y(m) may be rearranged used directly to compute the type-2 Inverse DCT of the image frame pixels.

The filtered coefficients are rearranged as follows:

$$Yd(m) = (Y_H(m) - Y_H(N-m))/\sqrt{2} \quad m=0, 1 \ldots N-1 \quad (13)$$

The type-2 IDCT is performed on Yd(m) using eq(11), resulting in a decimated image frame.

The following steps may be used to perform decimation in both directions on an image frame.

1) DCT of N×N (8×8) block of the image frame using eq(2).
2) Convolution of transformed coefficients and low-pass filter coefficients in the DCT domain.
3) Rearranging DCT coefficients using eq(13).
4) Inverse IDCT using eq(11).

Figure 5:
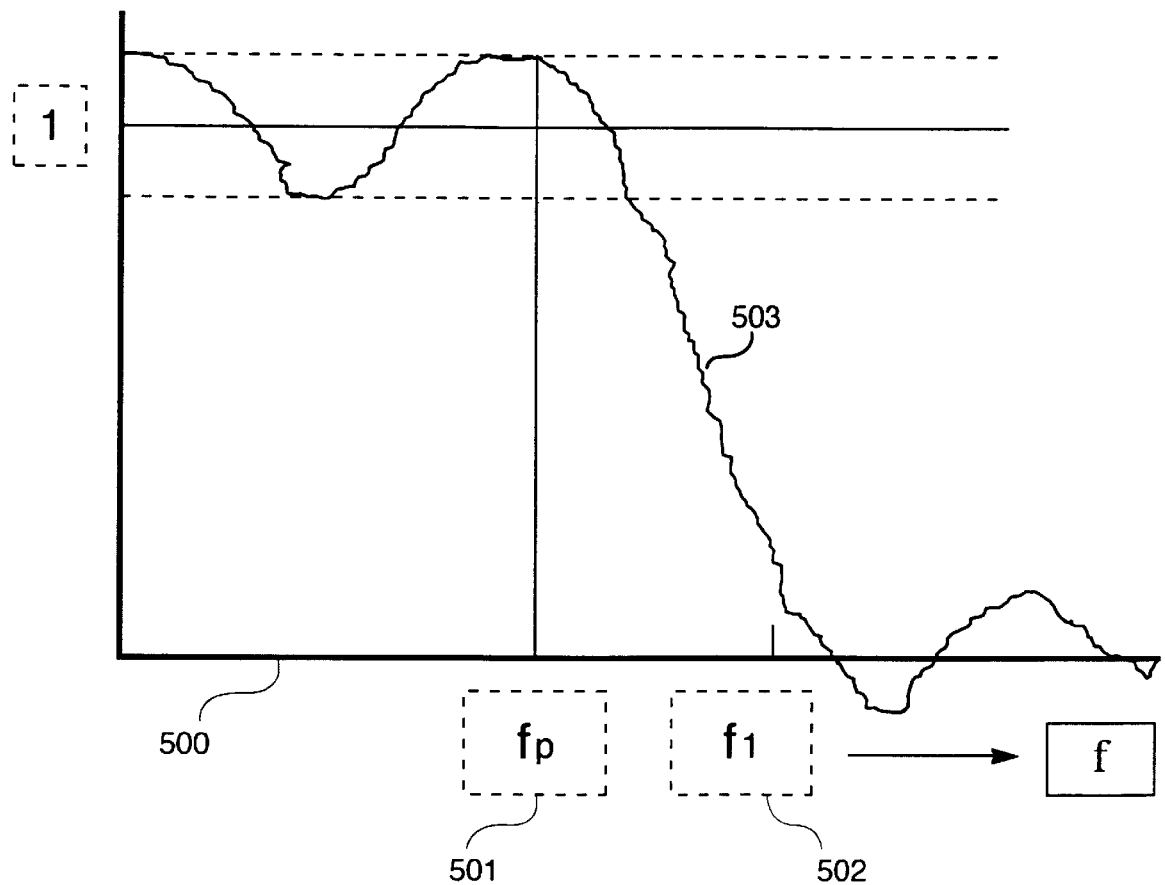
FIG. 5 is a graph illustrating the frequency response of a Remez Exchange filter.

FIG. 5 is a graph illustrating the frequency response of the Remez Exchange filter of FIG. 4. Response curve 503 of graph 500 with a Remez Exchange characteristic shows desirable pass band characteristics that correlate to the pass-band and stop-band characteristics as illustrated in FIG. 4. Pass band limit 501 clearly shows uniform characteristics in the Remez Exchange Filter pass band. Stop band limit 502 shows linear in-band characteristics and near zero energy at frequencies above stop band limit 502.

Figure 6:
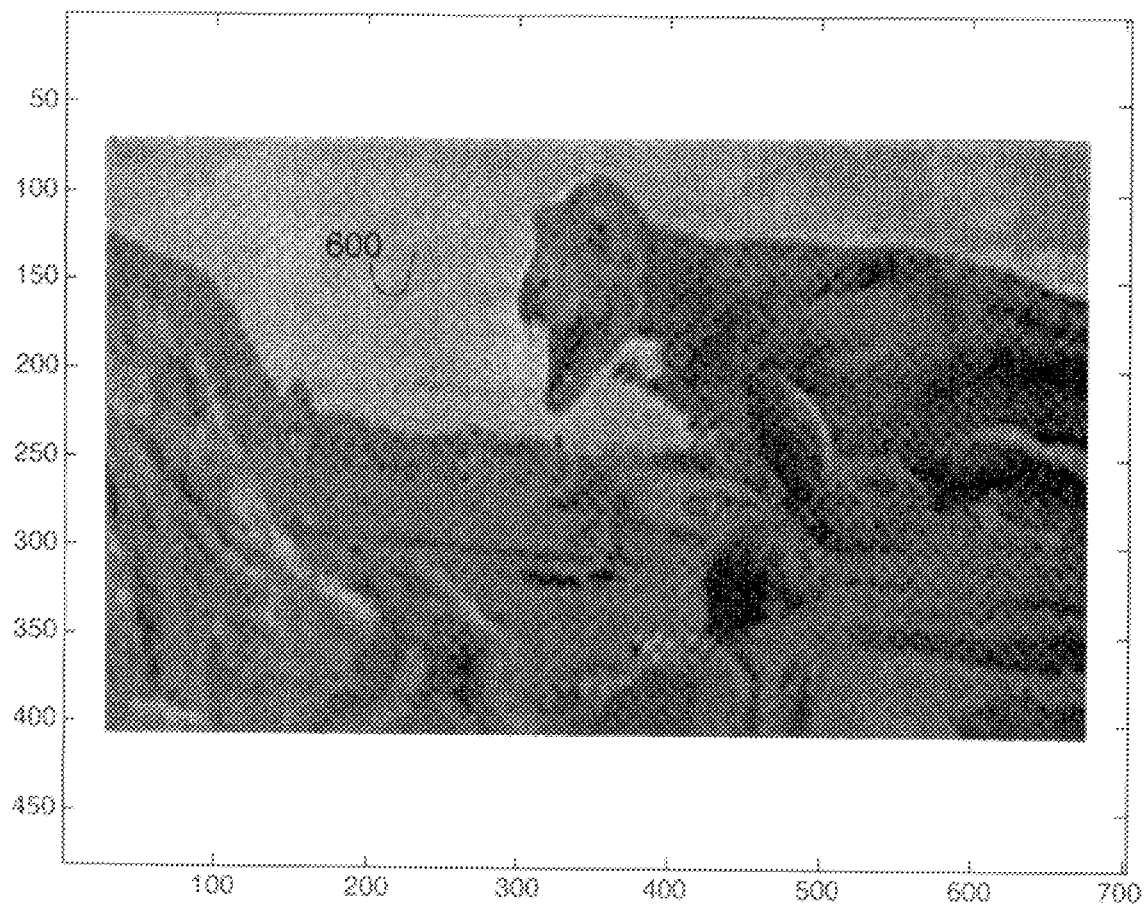
FIG. 6 is a diagram illustrating an image processed using prior art spatial domain interpolation.

FIG. 6 is a diagram illustrating an image processed using prior art spatial domain interpolation. The quality of edges and high spatial frequency information on image 600 may be compromised although not complete indiscernible.

Figure 7:
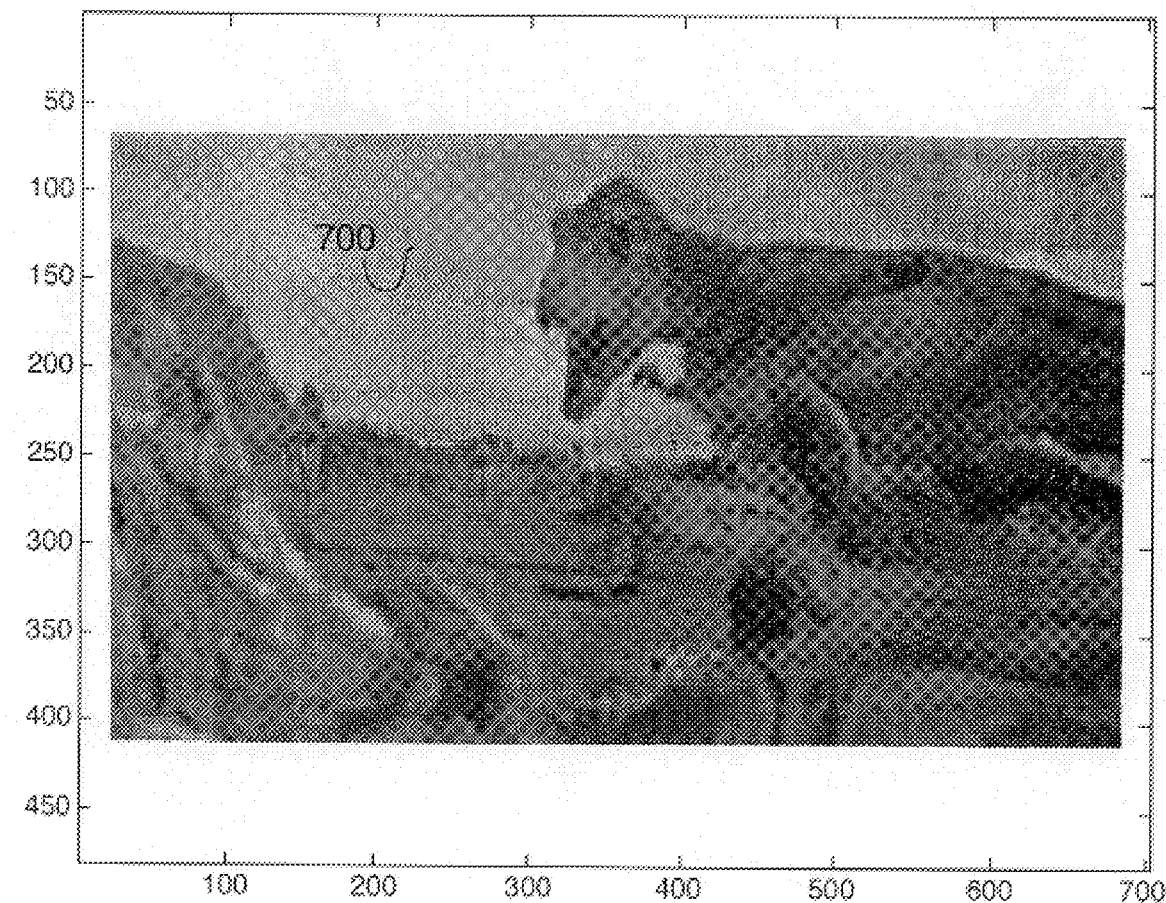
FIG. 7 is a diagram illustrating an image processed using DCT domain interpolation of the present invention.

FIG. 7 is a diagram illustrating an image processed using DCT domain interpolation of the present invention. Image 700 was rendered using the same base image as in FIG. 6. Image 700 may show superior edge rendering and more detail overall using DCT domain interpolation.

Figure 8:
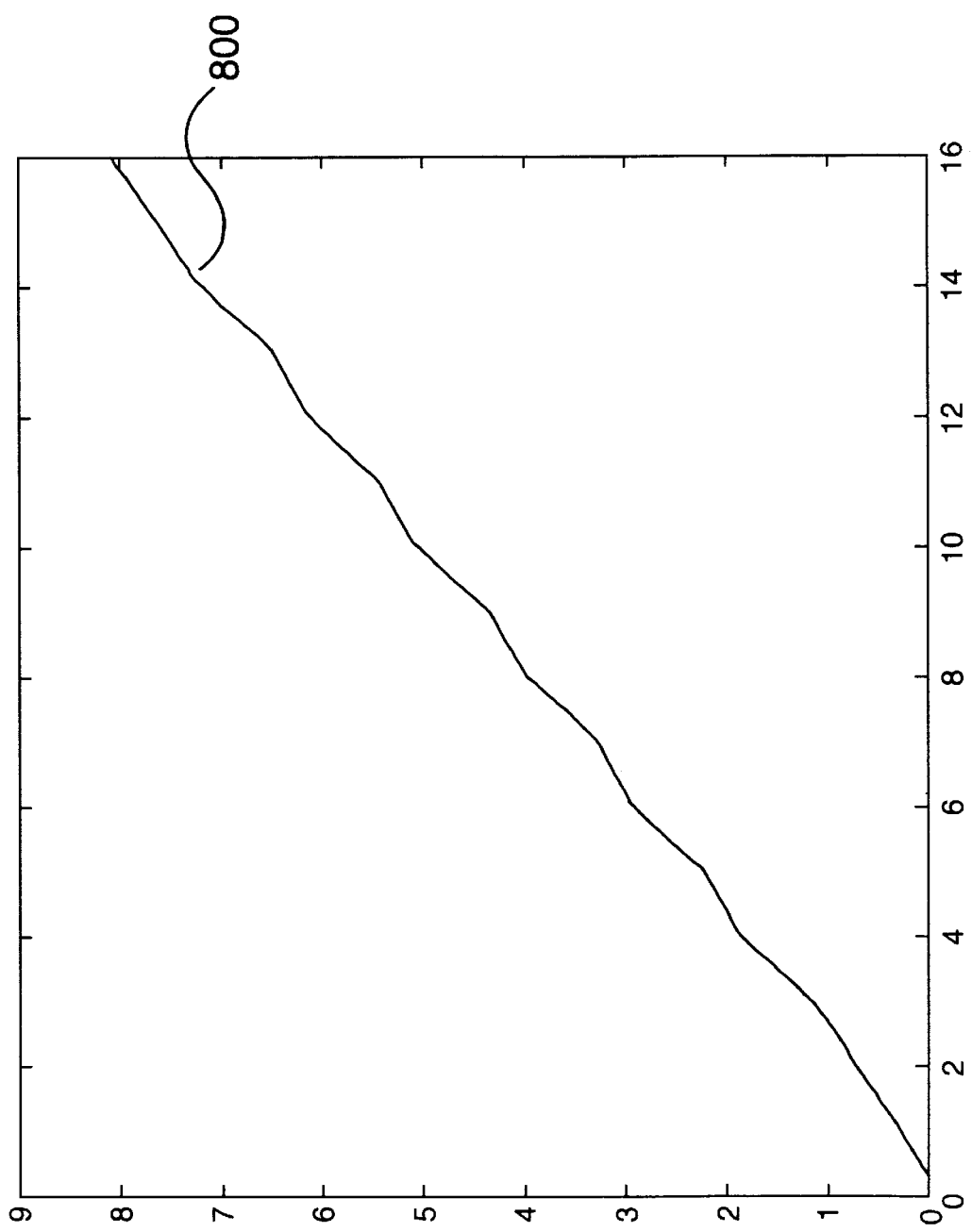
FIG. 8 is a graph illustrating a signal filtered using the present invention.

FIG. 8 is a graph illustrating a signal filtered using the present invention. After re-ordering up or downsampled video stream data, the filtering process produces graph 800. Alternate points on graph 800 prior to filtering were zero points. Depending on number of taps used in filtering results of the DCT domain interpolation, graph 800 may become smoother in direct proportion to number of taps.

With rapid evolution of multimedia technology, there may be a need for higher resolution motion video. An MPEG decoder which takes advantage of DCT domain interpolation, allows for programmable color space format decoding and translation by changing IDCT coefficients and block size, and which allows for resizing may be advantageous. Even though the number of operations required for DCT domain transformations may be significantly greater than for spatial frequency domain transformations, costs associated with additional hardware required to perform interpolation in the spatial frequency domain far exceeds the cost of additional operations required by DCT domain interpolation with no additional hardware.

While the preferred embodiment and various alternative embodiments of the invention have been disclosed and described in detail herein, it may be apparent to those skilled in the art that various changes in form and detail may be made without departing from the spirit and scope of the invention.

For example, while the IDCT described herein may be type 2, the present invention could be practiced on systems using one of many forms of IDCT. The color space formats while encompassing those commonly known and used, could be practiced on any color space format. Moreover, although the preferred embodiment is drawn to an implementation in an integrated circuit, the present invention may be applied to a series of integrated circuits, a chipset, or in other circuitry within a computer system without departing from the spirit and scope of the present invention.

We claim:

1. A decoder circuit in a display controller, said decoder circuit for decoding a video data signal, said decoder circuit comprising:

first transform means for receiving the video data signal, applying an inverse transform upon the video data signal, and outputting an inverse transformed video data signal;

wherein said first transform means comprises an Inverse Discrete Cosine Transform means comprising:

a sampling means for receiving inverse quantized Discrete Cosine Transform coefficients and a first at least one set of coefficients, applying a predetermined sampling process upon the inverse quantized Discrete Cosine Transform coefficients, and outputting a second at least one set of coefficients;

a filter means, coupled to said sampling means, for receiving the inverse quantized Discrete Cosine Transform coefficients and the second at least one set of coefficients, and applying a predetermined filter process upon the inverse quantized Discrete Cosine Transform coefficients, and outputting a third at least one set of coefficients;

a second transform means, coupled to said sampling means and said filter means, for receiving said second and said third at least one set of coefficients and a fourth at least one set of coefficients; and a register means, coupled to said second transform means, for storing said fourth at least one set of coefficients.

2. The decoder circuit of claim 1, further comprising:

decoder means, coupled to said first transform means, for receiving a video data signal, decoding the video data signal, and outputting a first decoded video data signal.

3. The decoder circuit of claim 2, wherein said decoder means receives an MPEG encoded video data signal.

4. The decoder circuit of claim 3 further comprising:

scan means, coupled to said decoder means, for receiving the first decoded video data signal, applying an inverse scan upon the decoded video data, and outputting an inverse scanned video data signal.

5. The decoder of claim 4 further comprising:

inverse quantizer means, coupled to said scan means, for receiving the inverse scanned video data signal, applying an inverse quantization upon the inverse scanned video data, and outputting an inverse quantized video data signal to said first transform means.

6. The decoder circuit of claim 5 further comprising:

motion compensation means, coupled to said first transform means, for receiving the inverse transformed video data signal, compensating the inverse transformed video data signal for motion and outputting a second decoded video data signal.

7. The decoder circuit of claim 6 further comprising:

frame storage means, coupled to said motion compensation means, for receiving the second decoded video data signal, storing at least one frame of the second decoded video data signal in at least one color space format, and outputting a third decoded video data signal.

8. A method, in a computer system, of decoding a video data stream in a display controller, said method comprising the steps of:

interpolating a video data stream and outputting an upsampled video data stream, and performing an Inverse Discrete Cosine Transform on the upsampled video data stream and outputting an Inverse Discrete Cosine Transform video data stream;

wherein said step of interpolating the video data stream further comprises interpolating the video data stream encoded in one of a plurality of color space formats comprising YUV 4:2:0, YUV 4:2:2, and YUV 4:4:4.

9. The method of claim 8 wherein said step of interpolating the upsampled video data stream further comprises the step of using a Remez Exchange symmetrical FIR filter to filter the video data stream to produce an upsampled data stream.

10. The method of claim 9 wherein said step of using a Remez Exchange symmetrical FIR filter comprises the step of using a Remez Exchange symmetrical FIR filter having at least two taps to filter the video data stream.

11. The method of claim 10 wherein said step of using a Remez Exchange symmetrical FIR filter comprises the step of using a Remez Exchange symmetrical FIR filter having 32 taps to filter the video data stream.

12. The method of claim 10 wherein said step of using a Remez Exchange symmetrical FIR filter comprises the step of using a Remez Exchange symmetrical FIR filter having any even number of taps between 2 and 32 taps to filter the video data stream.

13. The method of claim 11 wherein said step of performing an Inverse Discrete Cosine Transform further comprises outputting the Inverse Cosine Transform video stream to a motion compensation circuit.

14. A method, in a computer system of decoding a video stream in a display controller, said method comprising the steps of:

decimating a video stream and outputting a downsampled video data stream, and performing an Inverse Discrete Cosine Transform on the downsampled video data stream and outputting an Inverse Discrete Cosine Transform video data stream;

wherein said step of decimating the video data stream further comprises decimating the inverse quantized video data stream encoded in one of a plurality of color space formats comprising YUV 4:2:0, YUV 4:2:2, and YUV 4:4:4.

15. The method of claim 14 wherein said step of decimating the video data stream further comprises the step of using a Remez Exchange symmetrical FIR filter to filter the video data stream to produce a downsampled video data stream.

16. The method of claim 15 wherein said step of using a Remez Exchange symmetrical FIR filter comprises the step of using a Remez Exchange symmetrical FIR filter having at least two taps to filter the video data stream.

17. The method of claim 15 wherein said step of using a Remez Exchange symmetrical FIR filter comprises the step of using a Remez Exchange symmetrical FIR filter having 32 taps to filter the video data stream.

18. The method of claim 16 wherein said step of performing an Inverse Discrete Cosine Transform further comprises outputting the Inverse Cosine Transform video stream to a motion compensation circuit.

19. A computer comprising:

a central processing unit for controlling the operation of said computer;

a system bus, coupled to said central processing unit, for transferring data between system components including said central processing unit;

at least one memory area, coupled to said central processing unit and said system bus, for storing data;

a display, coupled to said central processing unit, said system bus, and at least one memory area, said display for displaying information from said computer; and a decoder, coupled to said central processing unit, said system bus, said at least one memory area and said display, for decoding an incoming MPEG video data stream in a first color space format and outputting a decoded video stream in a second color space format, said decoder comprising a first transform means for receiving incoming MPEG video data stream, applying an inverse transform upon the video data stream, and outputting an inverse transformed video data stream, wherein said first transform means comprises:

a sampling means for receiving inverse quantized Discrete Cosine Transform coefficients and a first at least one set of coefficients, applying a predetermined sampling process upon the inverse quantized Discrete Cosine Transform coefficients, and outputting a second at least one set of coefficients;

a filter means, coupled to said sampling means, for receiving the inverse quantized Discrete Cosine Transform coefficients and the second at least one set of coefficients, applying a predetermined filter process upon the inverse quantized Discrete Cosine Transform coefficients, and outputting a third at least one set of coefficients;

a second transform means, coupled to said sampling means and said filter means, for receiving said second and said third at least one set of coefficients and a fourth at least one set of coefficients; and a register means, coupled to said second transform means, for storing said fourth at least one set of coefficients.

20. The computer of claim 19, wherein said decoder further comprises:

first transform means for receiving the video data signal, applying an inverse transform upon the video data signal, and outputting an inverse transformed video data signal.

21. The computer of claim 19, wherein said first transform means comprises an Inverse Discrete Cosine Transform means.

22. The computer of claim 20, further comprising:

decoder means, coupled to said first transform means, for receiving a video data signal, decoding the video data signal, and outputting a first decoded video data signal.

23. The computer of claim 21, wherein said decoder means receives an MPEG encoded video data signal.

24. The computer of claim 22, further comprising:

scan means, coupled to said decoder means, for receiving the first decoded video data signal, applying an inverse scan upon the decoded video data, and outputting an inverse scanned video data signal.

25. The computer of claim 24, further comprising:

inverse quantizer means, coupled to said scan means, for receiving the inverse scanned video data signal, applying an inverse quantization upon the inverse scanned video data, and outputting an inverse quantized video data signal to said first transform means.

26. The computer of claim 24, further comprising:

motion compensation means, coupled to said first transform means, for receiving the inverse transformed video data signal, compensating the inverse transformed video data signal for motion, and outputting a second decoded video data signal.

27. The computer of claim 26, further comprising:

frame storage means, coupled to said motion compensation means, for receiving the second decoded video data signal, storing at least one frame of the second decoded video data signal in at least one color space format, and outputting a third decoded video data signal.

28. A video decoder with scalable picture size comprising an inverse discrete cosine transformer, for receiving coded video data, performing an inverse discrete cosine transform on the coded video data, and outputting decoded video data, said inverse discrete cosine transformer comprising:

means for receiving inverse quantized discrete cosine transform coefficients;

means for storing a set of programmable coefficients; and an inverse discrete cosine transformer, for receiving the inverse quantized discrete cosine transform coefficients, a set of programmable coefficients, and the coded video data, and performing an inverse discrete cosine transform on the coded video data using the inverse quantized discrete cosine transform coefficients and the set of programmable coefficients to output decoded video data, wherein the set of programmable coefficients are selected to determine picture size of the decoded video data.

* * * * *